United States Patent  
Cunico et al.

(10) Patent No.: US 9,277,180 B2  
(45) Date of Patent: Mar. 1, 2016

(54) DYNAMIC FACIAL FEATURE SUBSTITUTION FOR VIDEO CONFERENCING

(71) Applicant: International Business Machines Corporation, Armonk, NY (US)

(72) Inventors: Hernan A. Cunico, Holly Springs, NC (US); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/320,233

(22) Filed: Jun. 30, 2014

(65) Prior Publication Data  
US 2015/0381938 A1 Dec. 31, 2015

(51) Int. Cl.  
H04N 7/14 (2006.01)  
H04N 7/15 (2006.01)  
G06T 7/00 (2006.01)  
G06T 7/20 (2006.01)  
G06Q 99/00 (2006.01)

(52) U.S. Cl.  
CPC .............. *H04N 7/157* (2013.01); *G06T 7/0042* (2013.01); *G06T 7/20* (2013.01); *H04N 7/152* (2013.01); *H04N 7/155* (2013.01); *G06Q 99/00* (2013.01); *G06T 2207/10016* (2013.01); *G06T 2207/30201* (2013.01)

(58) Field of Classification Search  
CPC ................................................... G06Q 99/00  
USPC ...................... 348/14.1; 704/9, 246  
See application file for complete search history.

(56) References Cited

U.S. PATENT DOCUMENTS

| 8,243,116 | B2 | 8/2012 | Qvarfordt et al. | |
|---|---|---|---|---|
| 8,279,256 | B2 | 10/2012 | Yang et al. | |
| 2009/0079816 | A1 | 3/2009 | Qvarfordt et al. | |
| 2011/0060591 | A1 | 3/2011 | Chanvez et al. | |
| 2011/0263940 | A1* | 10/2011 | Yamaguchi | 600/163 |
| 2012/0290950 | A1 | 11/2012 | Rapaport et al. | |
| 2013/0088562 | A1 | 4/2013 | Hong et al. | |
| 2013/0139071 | A1* | 5/2013 | Hoff et al. | 715/756 |
| 2013/0176379 | A1 | 7/2013 | Rosenberg et al. | |
| 2013/0242031 | A1 | 9/2013 | Petterson et al. | |
| 2014/0032215 | A1* | 1/2014 | Bolton et al. | 704/235 |
| 2014/0201126 | A1 | 7/2014 | Zadeh et al. | |

(Continued)

OTHER PUBLICATIONS

Appendix P (List of IBM Patents or Patent Applications Treated as Related).

(Continued)

*Primary Examiner* — Creighton Smith  
(74) *Attorney, Agent, or Firm* — Maeve McCarthy (57) ABSTRACT

In an approach to determine facial feature substitution in a video conference, a computer receives one or more pre-recorded videos of an attendee of a video conference. The one or more pre-recorded videos include at least one pre-recorded video of an attendee speaking. The computer determines an avatar for use in place of a video of the attendee in the video conference. Furthermore, the computer determines one or more portions of the one or more pre-recorded videos of the attendee corresponding to at least one targeted facial feature of the attendee in the video of the attendee in the video conference. The computer substitutes the one or more portions of the one or more pre-recorded videos into the avatar, the substitution corresponding to the at least one targeted facial feature of the attendee in the video conference.

12 Claims, 4 Drawing Sheets

(56) References Cited

U.S. PATENT DOCUMENTS

2014/0314310 A1* 10/2014 Movellan et al. ............. 382/155
2015/0092009 A1    4/2015 DeLuca et al.
2015/0169938 A1*  6/2015 Yao et al. ........... G06K 9/00228

OTHER PUBLICATIONS

U.S. Appl. No. 14/320,131, entitled "Dynamic Character Substitution for Web Conferencing Based on Sentiment", filed Jun. 30, 2014.
U.S. Appl. No. 14/623,079, filed Feb. 16, 2015 entitled "Dynamic Facial Feature Substitution for Video Conferencing".
U.S. Appl. No. 14/623,139, entitled "Dynamic Character Substitution for Web Conferencing Based on Sentiment", filed Feb. 16, 2015.
Ask Ubuntu, "How do I feed Skype a prerecorded video", last edited Oct. 7, 2011, <http://askubuntu.com/questions/64700/how-do-i-feed-skype-a-prerecorded-video>.
Design, "Face Substitution demo", Vimeo, LLC, Copyright 2014, <http://vimeo.com/45826030>.
McDonald, "Face Substitution", Vimeo, LLC, Copyright 2014, <http://vimeo.com/29348533>.
H, Rasmus, "Face Substitution", You Tube, Published Jun. 13, 2013, <http://www.youtube.com/watch?v=HYYoex2wF38>.
Popular Science, "Creepiest Video Software Ever Substitutes Other People's Faces for Your Face, in Real Time", Copyright 2014, <http://www.popsci.com/technology/article/2011-09/creepiest-video-software-ever-substitutes-faces-real-time>.
ReadyTalk, <http://www.readytalk.com>, Copyright 2014.

* cited by examiner

DYNAMIC FACIAL FEATURE SUBSTITUTION FOR VIDEO CONFERENCING

CROSS-REFERENCE TO RELATED APPLICATION

This application is related to application Ser. No. 14/320,131.

BACKGROUND OF THE INVENTION

The present invention relates generally to the field of video and web conferencing, and more particularly to providing dynamic facial feature substitution in an avatar for a video conference.

Global business meetings commonly occur by video conference, connecting people across multiple continents and time zones. Video conferences enable participants to share video and audio content with each other in a computing environment across multiple continents. A communication device at each location with video and audio capability, such as a video camera or more commonly, a tablet, a laptop, a smart phone or a similar device utilizing a video conference platform, program or application may be used for video conference meetings. Video conferences provide attendees with the ability to interact and more clearly communicate using visual and verbal communication cues. Attendees may use facial expressions to aide verbal communication and, through face to face communication, develop relationships that aide in business endeavors and team building.

SUMMARY

An embodiment of the present invention discloses a method, a computer program product, and a computer system for determining facial feature substitution in a video conference. A computer receives one or more pre-recorded videos of an attendee of a video conference. The one or more pre-recorded videos include at least one video of an attendee speaking. The computer determines an avatar for use in place of a video of the attendee in the video conference. Furthermore, the computer determines one or more portions of the one or more pre-recorded videos of the attendee corresponding to at least one targeted facial feature of the attendee in the video of the attendee in the video conference. The computer substitutes the one or more portions of the one or more pre-recorded videos into the avatar, the substitution corresponding to the at least one targeted facial feature of the attendee in the video conference.

DETAILED DESCRIPTION

Video conferences provide a cost effective method to allow virtual face to face meetings with global attendees. Video conferences may used to aid in effective team building, problem solving and status meetings where attendees can use both verbal and visual communication modes. Embodiments of the present invention recognize that not all video conferences occur during regular work hours and while, ideally meeting attendees should present a business appropriate image or appearance, sometimes this is difficult to do. In addition, some attendee's role may only require a listen only need for status updates which may allow them to perform other tasks, e.g. check mail, messages or watch a stock report, during the meeting.

Embodiments of the present invention provide a video conference attendee with the capability to attend a video conference without business attire or without appropriate grooming such as shaving or applying make-up. The meeting attendee may use a pre-recorded video or an avatar to be used in place of a real-time video feed of the meeting attendee. Embodiments of the present invention provide the avatar, which can mimic or mirror the real-time motions or facial expressions of the attendee, by using facial recognition to substitute targeted facial features in the avatar with portions of pre-recorded video corresponding to the facial expressions of the attendee in the video conference.

Dynamic facial feature substitution of targeted facial features (e.g. the attendee's eye area, eye brow area, nose area and mouth area) in an avatar with pre-recorded video of the attendee's targeted facial features that closely matches the attendee's facial features in a real-time video feed provides an animated avatar capable of mimicking the attendee's facial movements. In embodiments of the present invention, dynamic facial feature substitution occurs by substituting portions of extracted video of facial areas of the pre-recorded video (e.g. the mouth or eye area) using facial recognition software to correlate or match the real-time video of the attendee, in particular, the attendee's facial features and movements, to a similar pre-recorded video exhibiting the same or similar facial expressions, facial movements or articulations. The pre-recorded video records the attendee presented appropriately for a video conference, for example, dressed in appropriate business attire, shaved, hair combed, and presenting their best or desired appearance.

Figure 1:
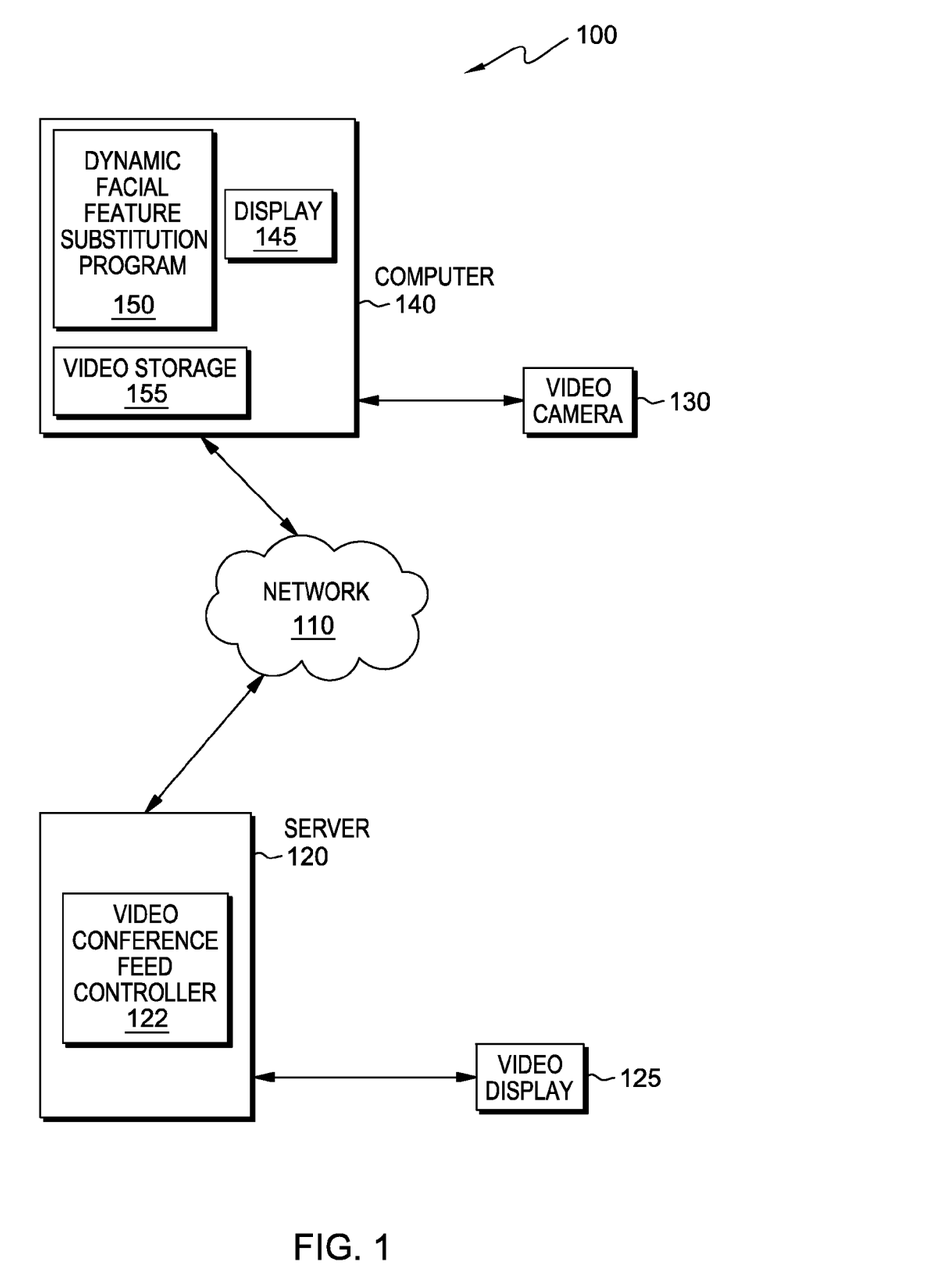
FIG. 1 is a functional block diagram illustrating a distributed data processing environment for a dynamic facial feature substitution program, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. Distributed data processing environment 100, includes network 110, server 120, video display 125, video camera 130 and computer 140, in accordance with an exemplary embodiment of the present invention.

In the exemplary embodiment, network 110 is the Internet representing a worldwide collection of networks and gateways that use TCP/IP protocols to communicate with one another. Network 110 may include any number of cables, routers, switches and/or firewalls. Server 120, video display 125, video camera 130 and computer 140 are interconnected by network 110. Network 110 can be any combination of connections and protocols capable of supporting communications between server 120, video display 125, video camera 130 and computer 140, including communication with dynamic facial feature substitution program 150. In other embodiments, network 110 may also be implemented as a number of different types of networks, such as an intranet, a local area network (LAN), a virtual local area network (VLAN), a wide area network (WAN), or any combination of a number of different types. FIG. 1 is intended as an example, and not as an architectural limitation for the different embodiments.

In the exemplary embodiment, server 120 may be, for example, a web server, a server computer such as a management server, or any other electronic device, computing device, or computing system capable of sending and receiving data. In another embodiment, server 120 represents a "cloud" of computers interconnected by one or more networks, where server 120 is a computing system utilizing clustered computers and components to act as a single pool of seamless resources when accessed through network 110. Server 120 includes video conference feed controller 122 which receives video from computer 140 which may be displayed on video display 125. Server 120 can connect to a video conference using video conference feed controller 122 and send video, such as a video feed of the video conference to computer 140 via network 110.

Computer 140 includes display 145, dynamic facial feature substitution program 150, and video storage 155. In the exemplary embodiment, computer 140 is a client to server 120. Computer 140 may be a notebook, a laptop, a smartphone, a personal digital assistant (PDA), a tablet computer, a desktop computer, a wearable computing device or any other computing device or system capable of communicating with server 120 through network 110. In the exemplary embodiment, computer 140 receives and sends video recorded from video camera 130 which is stored in video storage 155. In another embodiment, computer 140 may provide the ability to record video, and to send and to receive video such as may be accomplished with a smartphone or a tablet computer with video capability. In the exemplary embodiment, computer 140 receives one or more video feeds for a video conference or web conference as coordinated, integrated and received from video conference feed controller 122 via network 110 and shown on display 145. Display 145, which may also be a user interface, displays to a user video feed from a video conference. In the exemplary embodiment, computer 140 may send video which may be a real-time video from video camera 130 or a pre-recorded video retrieved from video storage 155 to video conference feed controller 122 for viewing on video display 125 by other attendees in the video conference. In one embodiment, computer 140 may not be a client device to server 120 but, may be connected via network 110 with one or more computing devices such as smart phones, laptops, wearable computing devices or notebooks each of which have video conference applications and video capability. In another embodiment, dynamic facial feature substitution program 150 is partially or fully integrated on server 120, or a remote "cloud" server such as a computer or a group of computing machines connected by a LAN or WAN. Computer 140 may include internal and external hardware components, as depicted and described in further detail with respect to FIG. 4.

In the exemplary embodiment, dynamic facial feature substitution program 150 on computer 140 utilizes facial recognition software to correlate or match a real-time video feed of an attendee's facial expression, facial movements and articulations to pre-recorded video of the attendee. In an embodiment, dynamic facial feature substitution program 150 may match portions of the pre-recorded video stored in video storage 155 to targeted facial features in the real-time video of the attendee in the video conference. In the exemplary embodiment, dynamic facial feature substitution program 150 receives video from video camera 130 and video conference feeds from video conference feed controller 122 for analysis and sends video to video conference feed controller 122 on server 120 via network 110 for display in the video conference. In other embodiments, dynamic facial feature substitution program 150 may receive and send one or more video feeds from other computing devices such as smart phones or wearable computing devices via network 110.

Dynamic facial feature substitution program 150 receives one or more pre-recorded videos of the attendee recorded on video camera 130 in various poses, exhibiting common facial expressions (e.g. smiling, neutral, attentively listening, frowning or laughing), and speaking numerous words and phrases commonly used in a video conference. Dynamic facial feature substitution program 150 stores the pre-recorded videos from video camera 130 in video storage 155. Receiving a request from a video conference attendee for an avatar with dynamic facial feature substitution, dynamic facial feature substitution program 150 selects an avatar by matching a pre-recorded video with a pose or a facial expression to the attendee's pose or facial expression in a real-time video feed or live video of the attendee. Dynamic facial feature substitution program 150 matches the pre-recorded video facial features with the real-time video facial features using facial recognition, which may be augmented with shape recognition algorithms to match the attendees body positioning or pose. The real-time video feed is a substantially "real-time" video feed or a near real-time video feed which may have some delay due to data transmission (i.e. cables, wires, networks, etc). Dynamic facial feature substitution program 150 may retrieve the pre-recorded video or avatar from video storage 155 and insert the avatar into the video feed sent to video conference feed controller 122 for the video conference. The avatar substitutes the real-time video feed of the attendee in the video conference and displays to other attendees of the video conference via video display 125.

Dynamic facial feature substitution program 150 provides dynamic facial feature substitution in which the avatar mimics the attendee's facial feature movements. Using facial recognition software to match the attendee's facial feature expressions, articulations and facial motions in the live or real-time video feed to the facial feature expressions, articulations and motions of targeted facial features in a pre-recorded video, dynamic facial feature substitution program 150 extracts the portions of the pre-recorded video corresponding to the attendee's targeted facial features. Using a co-ordinate map of one or more key facial elements, for example, a corner of the eyes, a center of the nose, and a corner of the mouth determined by dynamic facial feature substitution program 150, the program inserts the portions of the pre-recorded video into the avatar at corresponding points on the co-ordinate map. The portions of the pre-recorded video matching the attendee's facial expressions, words, or facial movements in the real-time video are substituted for the targeted facial features in the avatar. The avatar with dynamic facial feature substitution may be transmitted over network 110 to video conference feed controller 122 on server 120 for use in place of a real-time video feed of the attendee to represent via video display 125 the requesting attendee to the other video conference attendees viewing or attending the video conference, either within a conference room or single location, or remotely via network 110. Dynamic facial feature substitution program 150 provides the attendee with the capability to use an avatar mirroring the attendee's targeted facial features thus, providing a fully pre-recorded video of the attendee capable of mimicking the real-time reactions, articulations and facial movements of the attendee in the video conference.

Video storage 155 included on computer 140 stores videos and portions of video recorded by video camera 130 or a similar recording device capable of recording and sending video to computer 140. In an embodiment, video storage 155 receives portions of the pre-recorded videos from dynamic facial feature substitution program 150. Dynamic facial feature substitution program 150 may identify the portions by the targeted facial features in the portion, such as eye area, eyebrow area, nose area and mouth area, and may be further identified by facial expression, facial movements, sentiment exhibited or words spoken. In the exemplary embodiment of the present invention, dynamic facial feature substitution program 150 retrieves pre-recorded videos stored in video storage 155 for use as an avatar in the video conference. Dynamic facial feature substitution program 150 retrieves from video storage 155 one or more of the portions of the pre-recorded videos of the targeted facial features for use in facial feature substitution in the avatar to mimic or match facial expressions and articulations of the attendee in the real-time video feed in an embodiment. While depicted on computer 140 in the exemplary embodiment, video storage 155 may be included on a remote server, a web server, a "cloud" of computers interconnect by one or more networks utilizing clustered computers and components to act as a single pool of seamless resources, accessible by dynamic facial feature substitution program 150 via network 110.

Figure 2:
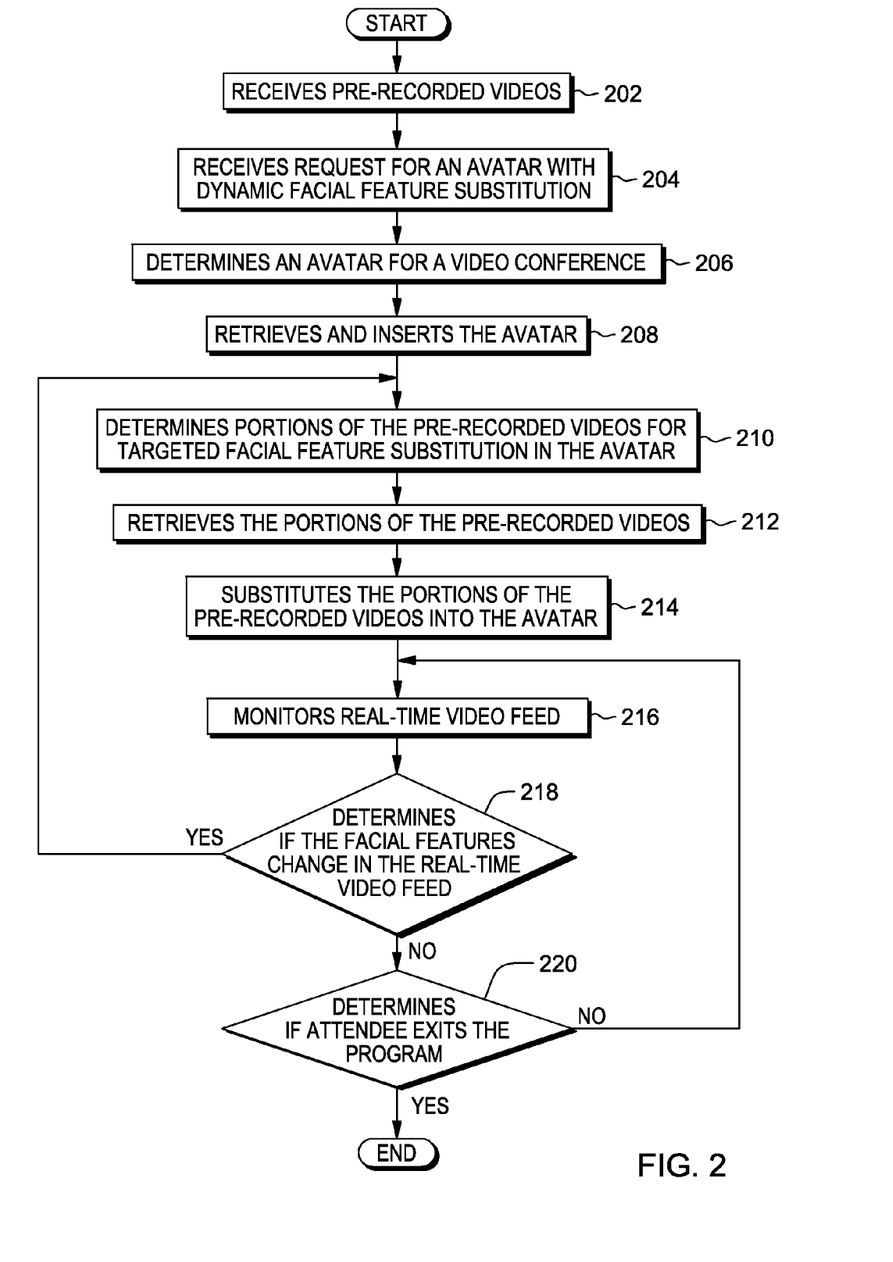
FIG. 2 is a flowchart depicting operational steps of a dynamic facial feature substitution program, on a computer within the data processing environment of FIG. 1, for use with an avatar in a video conference, in accordance with an embodiment of the present invention.

FIG. 2 is a flowchart depicting operational steps of dynamic facial feature substitution program 150, on a computer within data processing environment 100, for use with an avatar in a video conference, in accordance with an embodiment of the present invention.

In step 202, dynamic facial feature substitution program 150 receives one or more pre-recorded videos of the attendee. A video conference attendee desiring an avatar for use with dynamic facial feature substitution program 150 in a video conference, pre-records videos to capture the attendee's articulations and facial expressions. For the pre-recorded videos, the attendee presents the desired video conference appearance. For example, the groomed attendee wears business appropriate dress for a business video conference. The videos pre-recorded capture the attendee in various poses, with various expressions, and reading numerous phrases and words. Dynamic facial feature substitution program 150 may provide the numerous phrases and words spoken by the attendee to capture most commonly used words and expressions in similar video conferences (e.g. business video conferences, technical video conferences, artistic or music video conferences). The pre-recorded videos capture the attendee's articulations, facial movements and facial expressions exhibited for the various spoken words and phrases such as colloquial verbal phrases and words commonly used in video conferences. For example, a pre-recorded video of an attendee introducing himself may include the appropriate phrase and a smile. The pre-recorded videos can show various facial expressions exhibiting one or more various reactions, emotions or emotional states such as happy (e.g. smiling), frustrated, neutral (e.g. relaxed facial features) or amused (e.g. laughing). The videos exhibit a range of emotions or various levels of an emotion, for example, slightly happy with a slight, closed lip smile or very happy with a large open lip smile. In one embodiment, the pre-recorded videos are received with descriptive filenames relating the video content. For example, one video with a filename "Introduction" includes the pre-recorded video of the attendee introducing himself to the video conference. In an embodiment of the present invention, dynamic facial feature substitution program 150 may create a co-ordinate map of the attendee's key or targeted facial features, such as the corners of the eyes, edges of the eyebrows, nose or edges of the mouth for each of the pre-recorded videos. The co-ordinate map may track and map the attendee's facial movements.

In another embodiment, a single video recording of the user may capture all of the poses, spoken words, phrases and emotions anticipated to be exhibited in a video conference. Dynamic facial feature substitution program 150 can identify sections or segments of the video using an index of the video or markers within the video to identify desired video depicting facial movements for various words, phrases, reactions or emotions. For example, a video may have recorded minutes one to two of the attendee introducing themselves and recording minutes three to four of the attendee saying a commonly used phrase such as "I agree but, have we considered other options that may save cost?"

Figure 3:
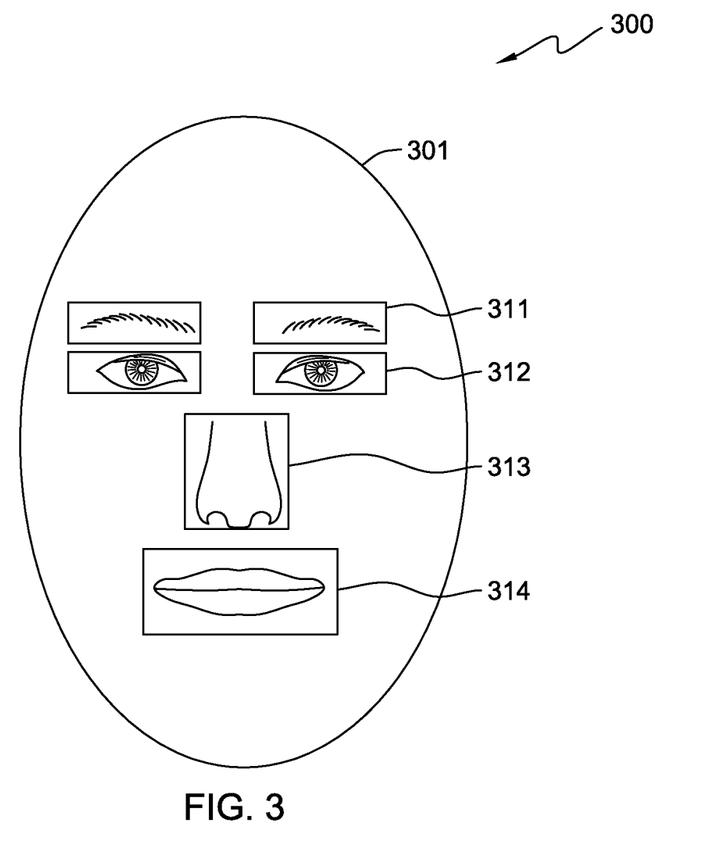
FIG. 3 is a diagram depicting an example of portions of pre-recorded videos used for dynamic facial feature substitution by the dynamic facial feature substitution program of FIG. 2, in accordance with an embodiment of the present invention.

In one embodiment, dynamic facial feature substitution program 150 may extract portions of the pre-recorded video corresponding to targeted facial features, for example, the eye area, the eye brow area or the mouth area and store the individual portions of the pre-recorded video of the attendee. The individual portions of pre-recorded video stored in video storage 155 may be retrieved for use in an avatar. Dynamic facial feature substitution program 150 may create a co-ordinate map of the outer edges of the portions of the pre-recorded video (e.g. the boxes containing of the video chunks or portions as depicted in FIG. 3).

In the exemplary embodiment, video camera 130 records the individual videos or video segments and sends the videos to computer 140 for storage in video storage 155. In one embodiment, computer 140, which may be, for example, a smartphone, a wearable computing device or a tablet, records the videos and stores the videos in video storage 155. In another embodiment, the one or more pre-recorded videos may be stored as files resident on the computer or in computer memory such as persistent storage 408 in FIG. 4.

In step 204, dynamic facial feature substitution program 150 receives a request for an avatar with dynamic facial feature substitution. Dynamic facial feature substitution program 150 receives, from a user via a user interface on display 145, an attendee generated request to use an avatar with dynamic facial feature substitution in place of a real-time video feed of the attendee in a video conference.

In step 206, dynamic facial feature substitution program 150 determines an avatar for a video conference. Dynamic facial feature substitution program 150 may determine the avatar or pre-recorded video of the attendee to be used for beginning the video conference in one of several ways. In one embodiment of the present invention, dynamic facial feature substitution program 150 correlates or matches the attendees pose in the real-time video recording just prior to initiating the avatar to a pose in a video of the various pre-recorded videos. The real-time video recording may be initiated automatically by dynamic facial feature substitution program 150 when a video conference attendee requests an avatar in embodiments of the present invention where video camera 130 is a web camera, for example, connected to computer 140 or integrated into computer 140. In other embodiments where video camera 130 is connected to computer 140 via cables or other connections, the real-time video may be started manually by the attendee. Dynamic facial feature substitution program 150 may utilize shape recognition software on key body points or body shape of a pose to determine a pre-recorded video with a similar pose to the real-time video of the attendee. In an embodiment, facial recognition software may be used to match a real-time video feed of the attendee's face to pre-recorded video. The pre-recorded video corresponding to the attendee's facial expression in the initial real-time video feed at the time of the request for a dynamic facial substitution may be used as the avatar. The request for an avatar using dynamic facial feature substitution may occur at the start of the video conference or at any time in the video conference. When the request for an avatar is received during the video conference, the avatar may be selected or determined by one or more of the facial recognition, shape recognition, natural language processing, speech recognition, sentiment analysis of the attendee or the meeting discussions.

In another embodiment, a pre-recorded video for initiating the video conference may be a pre-set or default selection for the initially used pre-recorded video or avatar in a video conference. A pre-recorded introduction video may, for example, show the attendee with a slight smile, a nod, or introducing themselves by name. In a different embodiment, dynamic facial feature substitution program 150 may determine the initial avatar or pre-recorded video for the start of the video conference by randomly selecting one of several pre-recorded videos of the attendee in a neutral or relaxed pose. In one embodiment, dynamic facial feature substitution program 150 may receive from a user interface on display 145 a user or attendee selected avatar to start the video conference. In yet another embodiment, dynamic facial feature substitution program 150 may determine a pre-recorded video or avatar to use initially based on a filename of the video, for example, a video labeled "introduction" in video storage 155.

In step 208, dynamic facial feature substitution program 150 retrieves and inserts the avatar. Dynamic facial feature substitution program 150 retrieves from video storage 155 the avatar or pre-recorded video determined for initial use in place of the real-time video feed of the attendee. Dynamic facial feature substitution program 150 inserts the avatar in place of the real-time video feed of the attendee in the video conference via network 110 and video conference feed controller 122.

In step 210, dynamic facial feature substitution program 150 determines portions of the pre-recorded videos for targeted facial feature substitution in the avatar. Using known facial recognition methods, facial analysis software, and feature recognition software and algorithms, dynamic facial feature substitution program 150 isolates and analyzes targeted facial features in the real-time video feed of the attendee, for example, an eye area or a mouth area, and corresponding facial movements and expressions of the targeted facial features, as the attendee speaks or moves. In an embodiment, the co-ordinate map created by dynamic facial feature substitution program 150 may track or map the facial movements of the attendee. In the exemplary embodiment, dynamic facial feature substitution program 150 determines the key or targeted features to be mapped.

Dynamic facial feature substitution program 150 determines the portions for targeted facial feature substitution by correlating or matching the targeted facial features and the movements of the targeted facial features in the real-time video feed of the attendee to one or more stored portions of the pre-recorded videos of the attendee using facial recognition. A portion of a pre-recorded video is a portion or a discreet piece (e.g. "chunk") of the pre-recorded videos that includes a targeted facial feature, for example, the attendee's eye area, which may be extracted from the pre-recorded video of the attendee. The portions of the targeted facial features include, for example, an eye area, an eye brow area, a nose area and a mouth area as illustrated later with reference to FIG. 3. While discussed as the eye area, eye brow area, nose area and mouth area, the portions of the pre-recorded video of the targeted facial features should not be limited to these areas but, may be a subset of these areas or may include different or larger areas such as the whole face or other parts of the face.

Dynamic facial feature substitution program 150 isolates the targeted facial features and creates one or more portions of the pre-recorded videos of the attendee speaking or exhibiting facial expressions such as laughing that may be inserted into an avatar or pre-recorded video of the attendee. Dynamic facial feature substitution program 150 inserts the portions of the pre-recorded video which match or correspond to the real-time facial expressions, articulations and movements to mimic or match the attendee's real-time facial expressions or articulations, as captured in the real-time video from video camera 130. In one embodiment, the portions of the pre-recorded video for the targeted facial features may be extracted from the pre-recorded video and stored in video storage 155 for re-use.

In the exemplary embodiment, dynamic facial feature substitution program 150 determines one or more targeted facial features in the real-time video feed used for creating the portions of the pre-recorded video, such as the eye area, eye brow area and mouth area. In one embodiment, the attendee may specify the targeted facial features or target areas for creating portions of the pre-recorded videos for substitution in pre-recorded video by highlighting the desired area or areas on one of the pre-recorded videos or a still image extracted from the pre-recorded video. In an embodiment, the attendee may select to create portions of the pre-recorded video which include the whole face.

In the exemplary embodiment, dynamic facial feature substitution program 150 matches or correlates the targeted facial features in the real-time video feed of the attendee using facial recognition to a corresponding pre-recorded video of the attendee and extracts the portions of the pre-recorded video corresponding to the targeted facial features. In another embodiment of the invention, the one or more portions of the pre-recorded videos stored in video storage 155 may be correlated or matched to the targeted facial features in the real-time video feed of the attendee by, for example, a video filename or a video marker name. For example, a real-time video feed of the attendee's mouth area with a slight frown may be matched to a video portion named, "mouth_frown1". In another embodiment, dynamic facial feature substitution program 150 may correlate the pre-recorded video to the real-time video feed of the attendee's whole body using both facial recognition and shape recognition.

Dynamic facial feature substitution program 150 selects or determines the portions of the pre-recorded video that match or mimic the attendee's real-time facial expressions and articulations in the real-time video feed by, for example, correlating the facial expressions and articulations of the real-time video feed to the pre-recorded video by analyzing key features and targeted facial features. When the selected or determined portions of the pre-recorded video (e.g. video chunks or extracted portions or parts of the pre-recorded video of the targeted facial features such as the eye area or the month area) are substituted into an avatar using dynamic facial feature substitution, a completely pre-recorded avatar mimicking or mirroring the actions of the "real-time" attendee is created. The avatar with dynamic facial feature substitution mirrors the real-time actions and facial feature movements of the attendee without including any real-time video of the attendee. Dynamic facial feature substitution program 150 is capable of creating an avatar depicting real-time facial features, articulations, and facial expressions of a video conference attendee without using real-time video of the attendee who, for example, may not have time to shave before the meeting.

In one embodiment of the present invention, a three dimensional face recognition system which uses three dimensional facial recognition algorithms and techniques may be used on the real-time video feed using known methods to create a three dimensional video capture such as projecting a grid on the attendees face and integrating the video capture into a three dimensional model. In this embodiment, a similar three dimensional video technique may be applied to the pre-recorded videos of the attendee. Three dimensional facial recognition algorithms may be applied to match corresponding pre-recorded video with the targeted facial features to a real-time video feed of the attendee. A three dimensional facial recognition system may provide another accurate correlation of facial features.

In another embodiment, dynamic facial feature substitution program 150 may use natural language processing and speech analysis to correlate words or various phrases to the pre-recorded words or phrases in the portions of the pre-recorded videos. In this embodiment, dynamic facial feature substitution program 150 analyzes the real-time audio feed of the attendee and determines one or more portions of pre-recorded videos to use in the avatar to simulate the attendee's spoken word and articulation by correlating the words and phrases using speech analysis to the associated or matching words and phrases in the pre-recorded video or the portions of the pre-recorded video. The analysis of the attendee's spoken words or verbally expressed emotions such as laughter may be used when the attendee does not have access to a video recording device or does not wish to use a real-time video recording but, still desires the use of an avatar with facial feature substitution to provide a real-time video visually depicting the attendee's facial feature motions or articulations for the video conference.

In a further embodiment, for situations when the user is in listen-only mode for a video conference or does not have access to a video recording device, dynamic facial feature substitution program 150 can use natural language processing and sentiment analysis of the discussions in the video conference to determine the meeting tone or sentiment and correlates the meeting tone to corresponding portions of the pre-recorded videos using facial analysis of the pre-recorded videos. For example, when meeting members share a joke and laugh, dynamic facial feature substitution program 150 may use facial recognition software to correlate a jovial meeting tone (e.g. a meeting with laughter) with a pre-recorded video of the attendee laughing. Dynamic facial feature substitution program 150 may retrieve the portions of targeted facial features of the pre-recorded videos correlated to the jovial meeting tone to insert into the avatar.

In step 212, dynamic facial feature substitution program 150 retrieves portions of the pre-recorded videos. Dynamic facial feature substitution program 150 retrieves from video storage 155 the one or more portions of the pre-recorded videos of the targeted facial features (i.e. eye area, eye brow area, or mouth area). In the exemplary embodiment, the retrieved portions of the pre-recorded video include a co-ordinate map of the key facial elements and the facial movements. In an embodiment, the facial recognition analysis of the real-time video feed may be correlated to the portions of the pre-recorded videos and retrieved by one of the following: a video filename, markers in a pre-recorded video, an index name or numbers in a pre-recorded video.

In step 214, dynamic facial feature substitution program 150 substitutes the portions of the pre-recorded videos into the avatar. Subsequent to retrieving the one or more pre-recorded portions of the pre-recorded videos corresponding to the attendee's real-time facial feature, movement or expression, dynamic facial feature substitution program 150 inserts the portions of the pre-recorded videos into the avatar. The avatar, with inserted portions of the pre-recorded video, is sent by dynamic facial feature substitution program 150 via network 110 to video conference feed controller 122. Video conference feed controller 122 may display the avatar on video display 125 for the remote video conference attendees and send video feed with the avatar to other video conference locations. Dynamic facial feature substitution program 150 utilizes the co-ordinate maps of key facial elements and facial movements created for the portions of the pre-recorded videos and the avatar (e.g. pre-recorded video). By matching the co-ordinate maps of the key facial elements for the portions of the pre-recorded videos and the avatar, the portions of the pre-recorded videos may be inserted into the avatar for the video conference. In various embodiments, known digital blending or smoothing techniques may be applied by dynamic facial feature substitution program 150 to create a seamless video of the avatar for inclusion in place of the real-time video feed of the attendee.

In step 216, dynamic facial feature substitution program 150 monitors real-time video feed. Dynamic facial feature substitution program 150 monitors the real-time video feed of the attendee for changes in pose, facial expressions, facial movements or articulations using facial recognition.

In step 218, dynamic facial feature substitution program 150 determines if the facial features change in the real-time video feed. Dynamic facial feature substitution program 150 monitors the real-time video of the attendee and using facial recognition algorithms, determines if changes to the facial features in the real-time video feed of the attendee occur such as a change in facial expression or a change in articulations (i.e. new words or phrases). When dynamic facial feature substitution program 150 determines that there is a change in the facial features of the attendee in the real-time video ("yes" branch, decision block 218), the program returns to step 210 to determine the one or more portions of the pre-recorded video to be substituted into the avatar in the video conference for the changed facial features.

If dynamic facial feature substitution program 150 determines there is no change in the facial features of the attendee ("no" branch, decision block 218), then the program, in step 220, determines if the attendee exits the program. In the exemplary embodiment, dynamic facial feature substitution program 150 utilizes facial recognition software to identify that there are no changes to the attendee's facial features in the real-time video feed and the portions of the pre-recorded video remain the same. In an embodiment of the present invention, when there is no change in the facial expression or articulations in the real-time video feed of the attendee, for a period of time determined by the system, for example four minutes, dynamic facial feature substitution program 150 may randomly insert a facial movement or another video of a similar but, slightly different facial expression. In another embodiment, dynamic facial feature substitution program 150 may randomly insert a movement and facial expression consistent with the meeting discussion sentiment as determined by natural language processing and sentiment analysis. In an embodiment, when there is no change in the facial features, dynamic facial feature substitution program 150 determines if the attendee exits the program, for example, to use a real-time feed in the video conference in place of the avatar or because the video conference has ended. If the attendee has exited the program ("yes" branch, decision block 220), the program ends processing. Dynamic facial feature substitution program 150 may be initiated, re-initiated or terminated at any time in the video conference.

If in step 220, dynamic facial feature substitution program 150 determines that the attendee does exit the program, the avatar is no longer sent to video conference feed controller 122 and the program ends. In another embodiment, the attendee may select to exit dynamic facial feature substitution program 150 by clicking an icon, tab or using another command to exit the program at any time in the video conference independent of the attendee's facial feature changes.

If in step 220, dynamic facial feature substitution program 150 determines that the attendee does not exit the program, then dynamic facial feature substitution program 150 proceeds back to step 216 and continues monitoring the real-time video feed ("no" branch, decision block 220).

FIG. 3 is a diagram, generally designated 300, depicting an example of portions of targeted facial features in the pre-recorded video used for dynamic facial feature substitution by a dynamic facial feature substitution program, in accordance with an embodiment of the present invention. Face 301 depicts targeted facial features including the eye area, the eye brow area, the nose area and the month area. The boxes around the targeted facial features indicate an example of determined one or more portions of the pre-recorded videos. Boxes 311 depict a portion of the pre-recorded video that is extracted or determined by dynamic facial feature substitution program 150 for the eye brow area. Similarly, boxes 312 depict the portion of the pre-recorded video that is extracted or determined by dynamic facial feature substitution program 150 for the eye area. Box 313 depicts the portion of the pre-recorded videos extracted or determined for the nose area and box 314 depicts the portion of the pre-recorded videos extracted or determined for the mouth area. The pre-recorded portions of the videos (e.g. portions or chunks of the pre-recorded video from the targeted facial features such as the areas depicted by boxes 311, boxes 312, box 313 and box 314) may be substituted in place of the corresponding portions of the face or facial features in the avatar based on a facial recognition analysis of the real-time video feed of the attendee. These portions or chunks of the pre-recorded video may be replaced independently as determined by dynamic facial feature substitution program 150 over a pre-recorded video or a cycling video used as an avatar of the attendee.

While depicted in FIG. 3 as the eye area, eye brow area, nose area and mouth area, the portions of the pre-recorded video (e.g. video portions of the targeted facial features) should not be limited to the depicted areas but, may be a subset of the illustrated areas or may include different or larger areas such as the whole face or other parts of the face.

Figure 4:
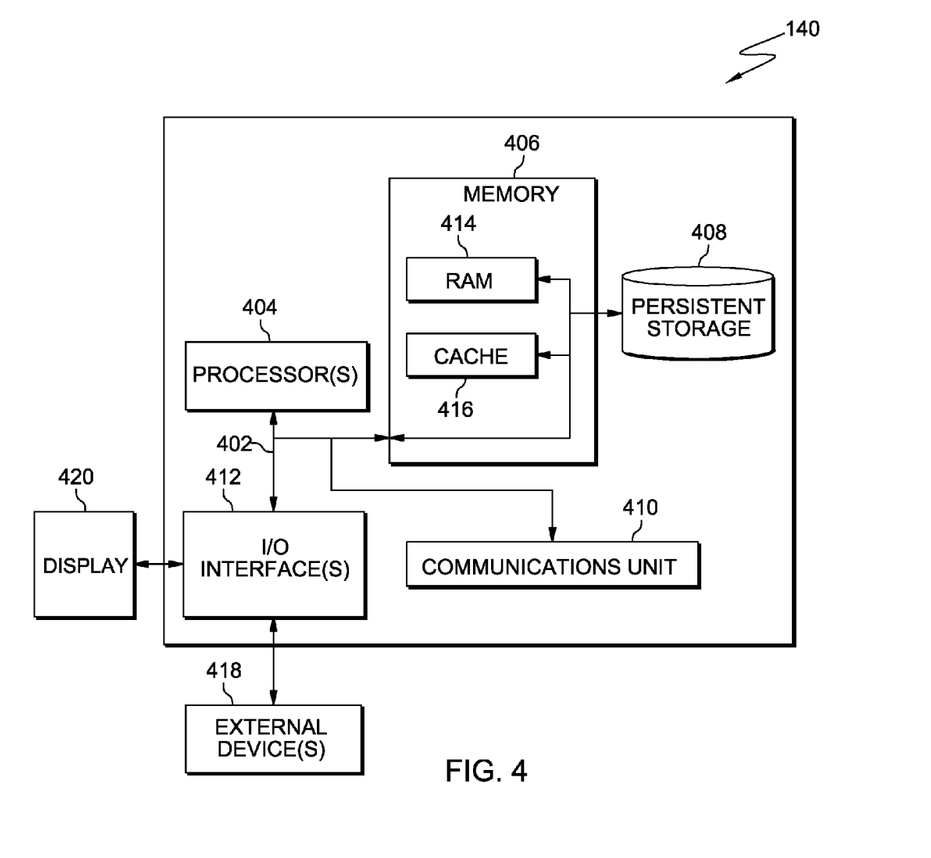
FIG. 4 is a block diagram of components of the computer in FIG. 1 executing the dynamic facial feature substitution program, in accordance with an embodiment of the present invention.

FIG. 4 depicts a block diagram of components of computer 140 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer 140 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Dynamic facial feature substitution program 150 can be stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of data processing environment 100 and computer 140 and server 120. In these examples, communications unit 410 includes one or more network interface cards. Communications unit 410 may provide communications through the use of either or both physical and wireless communications links. Dynamic facial feature substitution program 150 may be downloaded to persistent storage 408 through communications unit 410.

I/O interface(s) 412 allows for input and output of data with other devices that may be connected to computer 140. For example, I/O interface 412 may provide a connection to external devices 418 such as a keyboard, a keypad, a touch screen, and/or some other suitable input device. External device(s) 418 can also include portable computer readable storage media such as, for example, thumb drives, portable optical or magnetic disks, and memory cards. Software and data used to practice embodiments of the present invention, e.g., dynamic facial feature substitution program 150, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise of copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for facial feature substitution in a video conference, the computer program product comprising:
one or more computer readable storage devices and program instructions stored on the one or more computer readable storage devices, the program instructions executable by a processor, the program instructions comprising:
program instructions to receive one or more pre-recorded videos of an attendee participating in a video conference, the one or more pre-recorded videos including at least one pre-recorded video of an attendee speaking;
program instructions to determine an avatar for use in place of a live video feed of the attendee in the video conference;
program instructions to determine one or more portions of the one or more pre-recorded videos of the attendee corresponding to at least one targeted facial feature of the attendee in the live video feed of the attendee participating in the video conference; and
program instructions to substitute the one or more portions of the one or more pre-recorded videos into the avatar, the substitution corresponding to the at least one targeted facial feature of the attendee such that the avatar mimics the at least one targeted facial feature of the attendee in the video conference.

2. The computer program product of claim 1, wherein the program instructions to substitute the one or more portions of the one or more pre-recorded videos into the avatar further comprise:
program instructions to create a co-ordinate map of one or more key facial elements of the attendee in the one or more pre-recorded videos;
program instructions to create a co-ordinate map of one or more key facial elements of the attendee in the video of the attendee in the video conference;
program instructions to match the co-ordinate map of the one or more pre-recorded videos to the co-ordinate map of the video of the attendee in the video conference; and
program instructions to substitute, based, at least in part, on the matched co-ordinate maps, the one or more portions of the one or more pre-recorded videos into the avatar.

3. The computer program product of claim 1, wherein the program instructions to determine one or more portions of the one or more pre-recorded videos of the attendee corresponding to at least one targeted facial feature of the attendee in the live video feed of the attendee participating in the video conference further comprise program instructions to use facial recognition algorithms to correlate facial expressions and facial movements in the live video feed to the one or more pre-recorded videos.

4. The computer program product of claim 1, wherein the program instructions to determine one or more portions of the one or more pre-recorded videos of the attendee corresponding to at least one targeted facial feature of the attendee in the live video feed of the attendee participating in the video conference further comprise program instructions to use at least one of natural language processing and speech recognition to match corresponding one or more words in the live video feed of the attendee participating in the video conference to one or more words in the one or more pre-recorded videos.

5. The computer program product of claim 1, wherein the program instructions to determine one or more portions of the one or more pre-recorded videos of the attendee for at least one targeted facial feature of the attendee in the live video feed of the attendee participating in the video conference further comprise program instructions to use sentiment analysis to correlate a sentiment of the live video feed of the attendee participating in the video conference to a sentiment the one or more portions of the one or more pre-recorded videos.

6. The computer program product of claim 1, further comprises:
program instructions to monitor the live video feed of the attendee participating in the video conference;
program instructions to determine whether the at least one targeted facial feature of the attendee changed;
responsive to determining the at least one targeted facial feature of the attendee changed, program instructions to determine at least one additional portion of the one or more pre-recorded videos corresponding to the changed at least one targeted facial feature; and
program instructions to substitute the at least one additional portion of the one or more pre-recorded videos into the avatar.

7. A computer system for facial feature substitution in a video conference, the computer system comprising:
one or more computer processors;
one or more computer readable storage devices;
program instructions stored on the computer readable storage devices for execution by at least one of the one or more processors, the program instructions comprising:
program instructions to receive one or more pre-recorded videos of an attendee participating in a video conference, the one or more pre-recorded videos including at least one pre-recorded video of an attendee speaking;
program instructions to determine an avatar for use in place of a live video feed of the attendee in the video conference;
program instructions to determine one or more portions of the one or more pre-recorded videos of the attendee corresponding to at least one targeted facial feature of the attendee in the live video feed of the attendee participating in the video conference; and
program instructions to substitute the one or more portions of the one or more pre-recorded videos into the avatar, the substitution corresponding to the at least one targeted facial feature of the attendee such that the avatar mimics the at least one targeted facial feature of the attendee in the video conference.

8. The computer system of claim 7, wherein the program instructions to substitute the one or more portions of the one or more pre-recorded videos into the avatar further comprise:
program instructions to create a co-ordinate map of one or more key facial elements of the attendee in the one or more pre-recorded videos;
program instructions to create a co-ordinate map of one or more key facial elements of the attendee in the video of the attendee in the video conference;
program instructions to match the co-ordinate map of the one or more pre-recorded videos to the co-ordinate map of the video of the attendee in the video conference; and
program instructions to substitute, based, at least in part, on the matched co-ordinate maps, the one or more portions of the one or more pre-recorded videos into the avatar.

9. The computer system of claim 7, wherein the program instructions to determine one or more portions of the one or more pre-recorded videos of the attendee corresponding to at least one targeted facial feature of the attendee in the live video feed of the attendee participating in the video conference further comprise program instructions to use facial recognition algorithms to correlate facial expressions and facial movements in the live video feed to the one or more pre-recorded videos.

10. The computer system of claim 7, wherein the program instructions to determine one or more portions of the one or more pre-recorded videos of the attendee corresponding to at least one targeted facial feature of the attendee in the live video feed of the attendee participating in the video conference further comprise program instructions to use at least one of natural language processing and speech recognition to match corresponding one or more words in the live video feed of the attendee participating in the video conference to one or more words in the one or more pre-recorded videos.

11. The computer system of claim 7, wherein the program instructions to determine one or more portions of the one or more pre-recorded videos of the attendee for at least one targeted facial feature of the attendee in the live video feed of the attendee participating in the video conference further comprise program instructions to use sentiment analysis to correlate a sentiment of the live video feed of the attendee participating in the video conference to a sentiment the one or more portions of the one or more pre-recorded videos.

12. The computer system of claim 7, further comprises:
program instructions to monitor the live video feed of the attendee participating in the video conference;
program instructions to determine whether the at least one targeted facial feature of the attendee changed;
responsive to determining the at least one targeted facial feature of the attendee changed, program instructions to determine at least one additional portion of the one or more pre-recorded videos corresponding to the changed at least one targeted facial feature of the attendee; and
program instructions to substitute the at least one additional portion of the one or more pre-recorded videos into the avatar.

* * * * *